United States Patent [19]

Gottemoller et al.

[11] Patent Number: 5,775,817
[45] Date of Patent: Jul. 7, 1998

[54] FRACTURE PROCESS WITH BORE DISTORTION CONTROLS

[75] Inventors: Paul Gottemoller, Palos Park; Melvin Jerry Tomblin, Kankakee, both of Ill.

[73] Assignee: General Motors Corporation, Detroit, Mich.

[21] Appl. No.: 743,581

[22] Filed: Nov. 4, 1996

[51] Int. Cl.⁶ .................................................. F16C 33/64
[52] U.S. Cl. .......................................... 384/434; 384/503
[58] Field of Search ................................. 384/503, 294, 384/288, 434, 432

[56] References Cited

U.S. PATENT DOCUMENTS

| | | | |
|---|---|---|---|
| 4,684,267 | 8/1987 | Fetouh | 384/503 |
| 5,536,089 | 7/1996 | Weber et al. | 384/503 |

*Primary Examiner*—Lenard A. Footland
*Attorney, Agent, or Firm*—Karl F. Barr, Jr.

[57] ABSTRACT

The present invention is directed to a split bearing assembly and the method of manufacturing the same which substantially reduces material yielding and deformation during fracture. The bearing assembly includes a saddle-like main body with first and second legs and a removable saddle-like bearing cap with first and second legs. The ends of the cap are secured in end-to-end engagement with mating ends of the first and second legs of the body to define a journal receiving opening. The mating ends are defined by a portion of rough uneven mating surfaces formed by fracturing the cap from the body and a slot or saw-cut portion which operates to reduce the cross-sectional area of the first portion. The reduction in cross section of the mating ends, through the use of the saw-cut, operates to minimize the magnitude of the force which is required to initiate the fracture of the bearing cap from the body of the bearing assembly thereby limiting the deformation of the material in the fracture area. In addition, the reduced cross-sectional portion is crushable, upon assembly of the cap to the body, to adjust for deformation in the journal receiving opening.

2 Claims, 2 Drawing Sheets

FRACTURE PROCESS WITH BORE DISTORTION CONTROLS

TECHNICAL FIELD

The present invention is related to a bearing assembly for use in an internal combustion engine and a method for its construction.

BACKGROUND OF THE INVENTION

It is known to provide split bearing assemblies in various structural and machine components for supporting, or being supported by, the journals of rotating shafts and the like. Examples of applications for split bearing assemblies include engine crankshaft main and connecting rod bearing assemblies, some camshaft bearing assemblies, crank supporting bearing assemblies, and other rotatable shaft-supporting bearing assemblies, in all of which a removable, saddle-like bearing cap is secured to a mating saddle-like main body to provide for the installation and removal of a rotatable shaft, an attached connecting rod or the like.

A common method for manufacturing the separable main bodies and caps of split bearing assemblies is to separately form them by casting, forging or otherwise and to subsequently bolt, or otherwise secure together the caps and the main bodies. In some instances, finish machining of the journal encircling opening is completed following the initial assembly of these components. This manufacturing method requires a substantial number of machining operations, as well as preliminary assembly and disassembly of the components, before the supporting or supported shaft may be installed.

Another known manufacturing method involves forming the main body and cap integrally and separating them during manufacture by sawing or cutting away excess material provided to initially join the components. This method also requires machining of the connecting surfaces and other portions, generally including preliminary assembly.

In the case particularly of connecting rods and camshaft bearing assemblies, the prior art teaches other methods of forming the main body and cap as integral members and completely matching all necessary surfaces, including the journal encircling opening or bore, before separating the main body and cap members. The members are separated by material fracture techniques which involve fracturing the components along predetermined fracture planes, leaving interlocking rough surfaces that are capable of being re-engaged for assembly of the components into an operating assembly.

The above mentioned fracture techniques include various methods of weakening the separation planes, such as by drilling holes therein and/or providing weakening notches along one or more edges. Embrittlement of the material in the separating planes may also be provided for either by material selection, heat treatment, or by freezing the material to reduce its temperature below the embrittlement point.

The various types of prior fracture techniques introduce problems such as excessive bending of the separating parts which results in yielding deformation and interferes with the re-assembly of the separated components. Deformation of the previously machined opening can also present difficulty in operation following re-assembly. Such difficulties may limit the useable applications of fracture techniques and may require additional machining operations to clean up or correct deformation and yielding problems.

SUMMARY OF THE INVENTION

The present invention provides a split bearing assembly and a method for its manufacture, which substantially reduces material yielding, during fracture. The method presented herein utilizes a novel fracture technique that minimizes the problems associated with material bending deformation during fracture thereby avoiding or minimizing the necessity for additional machining following separation. The novel configuration and methods are applicable not only to connecting rods and similar items to which fracture separation has been previously applied, but also to components having a plurality of bearing caps connected to a single body such as an engine block, to provide a novel assembly.

The invention, disclosed herein in a cam bearing block assembly, involves a reduction in the magnitude of the force required to initiate the fracture of the bearing cap from the body. Force reduction is accomplished through a reduction in the cross sectional area to be fractured by initiating a saw-cut opposite the pilot notch used to initiate the starting points of separation. The saw-cut extends perpendicular to the bolt through openings and extends into the legs of the cam shaft bearing assembly a predetermined distance to accomplish the desired reduction in cross-section.

During the fracture process, the notched side of each bearing leg is relied on to initiate the fracture. As the fracture travels through a leg, the saw-cut functions as a terminus line for the fracture resulting in an even separation and reliable re-assembly of the component.

Additionally, when the fractured bearing assembly is reassembled the cross sectional area of the fractured surface affects the local elastic deformation or deflection available at the joint. The depth of the saw cut is used to adjust the fracture area thereby allowing adjustment of the joint deflection caused by bolt-up crush. With proper selection of the joint fracture area, minimal bore distortion in the normal direction to the fracture plane can be corrected through intentional joint deflection during assembly.

These and other features, objects, and advantages of the invention will be more apparent from the following detailed description and the drawings.

DESCRIPTION OF THE PREFERRED EMBODIMENT

Figure 1:
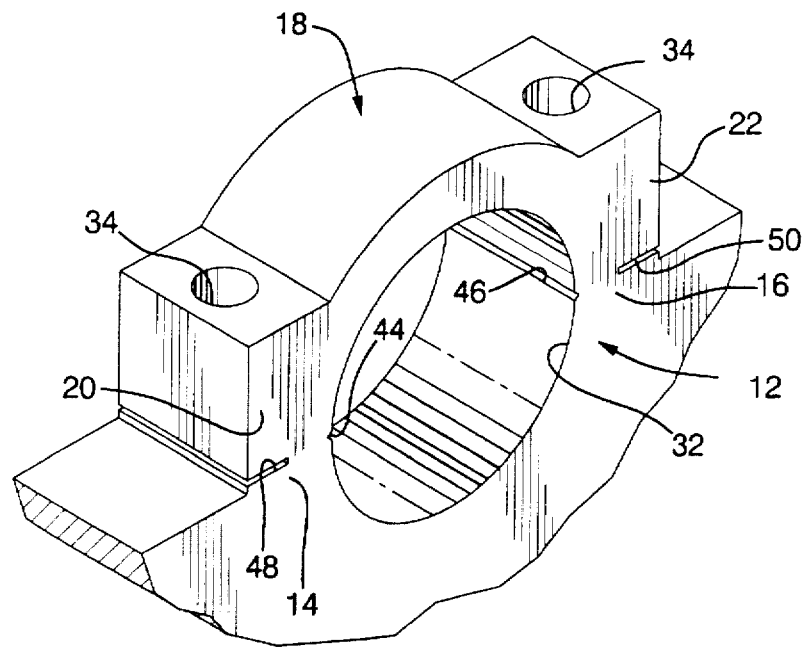
FIG. 1 is a partial, perspective view of a bearing assembly prior to fracture separation of the bearing cap from the main body.
Figure 2:
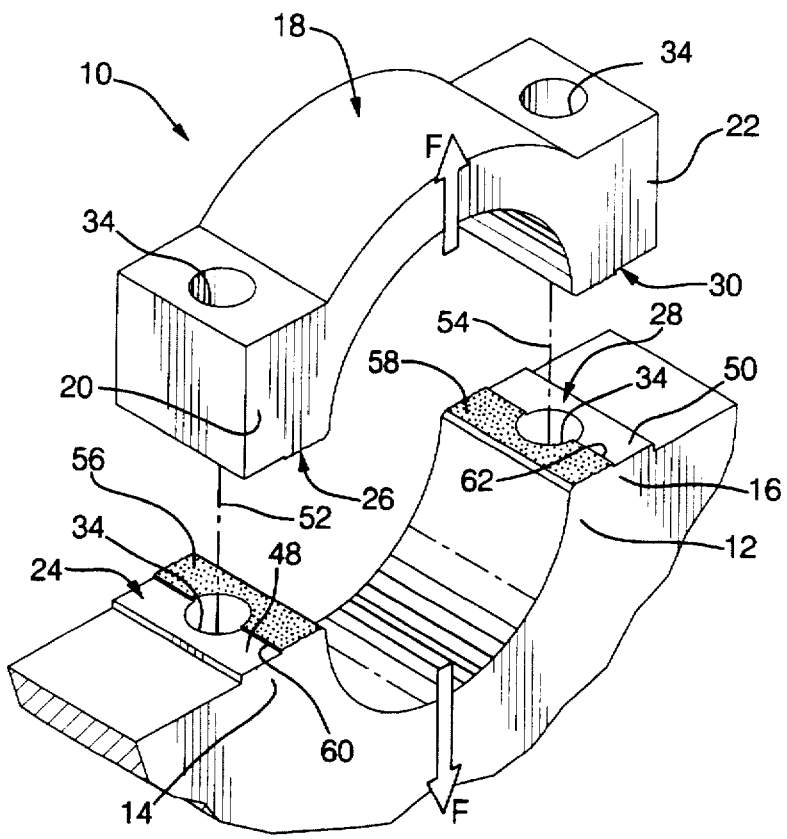
FIG. 2 is a partial, perspective view of the bearing assembly of FIG. 1, subsequent to fracture separation of the bearing cap from the main body.

Referring to FIGS. 1 and 2, there is represented the camshaft encircling portion of a camshaft bearing assembly, designated generally as 10, of the type for use in an internal combustion engine. The bearing assembly includes a saddle-like main body 12 which is bifurcated to form first and second legs 14 and 16, respectively and a removable saddle-like bearing cap 18 that is also bifurcated to define first and second legs 20 and 22. The first legs 14,20 of the body 12 and cap 18 have mating ends 24 and 26, respectively and the second legs 16,22 of the body 12 and the cap 18 similarly have mating ends 28 and 30 respectively.

The mating ends 24,26 and 28,30 are secured in end-to-end engagement so that the saddle-like members 12,18 define a journal receiving opening 32 in which a camshaft journal, not shown, is received. Commonly, split insert bearing shells, not shown, are clamped within the journal receiving opening 32 to provide a suitable bearing surface for relative rotation of the camshaft within a camshaft bearing gallery of the internal combustion engine.

Figure 3:
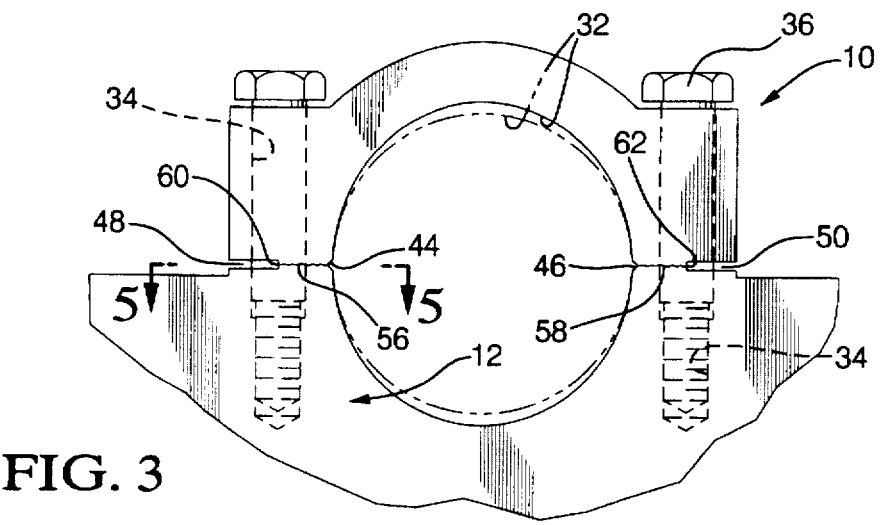
FIGS. 3 and 4 are front views of the bearing assembly of the present invention at different steps of assembly.

As shown, the bifurcated legs 14,16,20,22 of the body 12 and the cap 18 incorporate integral bolt bosses through which bolt openings 34 extend from the distal ends of the cap legs 20,22 through the mating ends 24,26,28,30 and into the legs 14,16 of the body 12 to receive bolts 36, FIG. 3, that threadably engage the legs 14 and 16 of the body 12 and secure the legs 20,22 of the cap 18 in engagement therewith.

Figure 4:
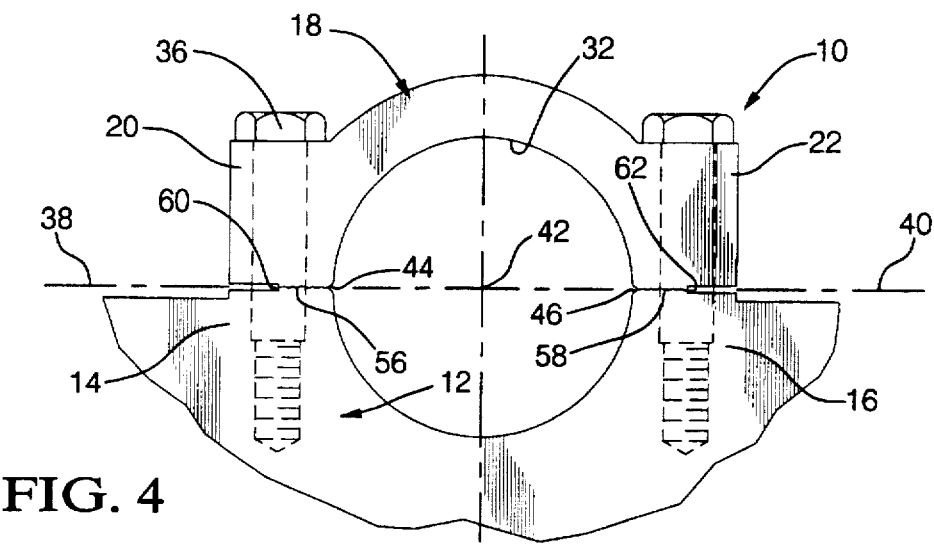

The mating ends 24,26 and 28,30 of the legs 20,22 and 14,16 of the cap 18 and the body 12 are comprised of rough uneven mating surfaces formed by the fracture method to be subsequently described. The mating ends lie generally along split planes 38 and 40, FIG. 4, located on opposite sides of the opening 32. In the present example, the split planes lie on a common transverse diametrical plane passing substantially through the axis 42 of the camshaft encircling opening 32. At the inner edges of the mating ends 24,26 and 28,30 along the split planes 38,40 are formed notches 44,46 in the periphery of and extending longitudinally for the length of the cylindrical opening 32 to initiate and locate the starting points of separation in the subsequent fracture steps and form the inner edges of the mating legs of the cap and body. At the outer edges of the mating ends 24,26 and 28,30 along the split planes 38,40 are formed saw-cuts or slots 48 and 50 in the periphery of and extending longitudinally for the length of the legs to locate the ending edge of separation resulting from the fracture initiated at the notches 44 and 46. In the preferred embodiment of the Figures shown, the slots 48 and 50 terminate in substantially straight, leading edges 60 and 62. The leading edges 60 and 62 function, as described, to locate the termination edge of the fracture plane in the legs 14,16 and 20 22. It is contemplated however that in order to optimize the fracture of bearing cap 18 from the body 12, the saw cuts or slots 48 and 50 may employ varying configurations such as leading edges 60 and 62 which are curved, angled, or otherwise non-linear to better control the propagation of the fracture front. Additionally, it is not necessary that the slots 48 and 50 be places along the split planes 38 and 40, but may be located, such as at an angle, so as to avoid obstacles such as other engine components which could function to prevent machining access along the planes.

The steps in a preferred form of method, according to the invention, for manufacturing the camshaft bearing assembly 10 are as follows. The integral, unfinished camshaft bearing assembly 10, FIG. 1, including unseparated body 12 and cap 18 portions with a camshaft encircling opening 32 defined thereby, is formed in a suitable manner such as by casting, forging or the like. The integral bearing assembly 10 is then machined to its finished dimensions by machining the bore 32, drilling and threading the bolt openings 34 and also finishing the surfaces of the assembly, if desired. Preferably, notches 44,46 are machined, or otherwise formed, so as to extend longitudinally along the opposite lateral sides of the bore 32.

Saw-cuts or slots 48,50 are located laterally adjacent to the notches along split planes 38,40, and extend into the bearing assembly so as to extend perpendicular to the axis 52,54 of each leg 14,20 and 16,22, respectively. The extent to which the saw-cut penetrates the leg of the bearing assembly will depend upon the desired magnitude of the force required to initiate fracture at each notch 44,46. As the cross-section of the fracture joints 56,58 is reduced, the magnitude of the force required will be similarly reduced. Such a force/cross-section reduction is balanced with desired strength and durability parameters for the bearing assembly.

Following machining, preparation is made for separating the bearing cap 18 from the body 12. For this purpose, the material in the area of the split planes 38 and 40, must be sufficiently brittle. If the material of the camshaft bearing assembly 10 has sufficiently brittle characteristics, such as cast iron and some aluminum alloys, no additional preparation may be required. Less brittle materials, such as steel, may require heat treatment or selective hardening by any suitable process to embrittle the material sufficiently along the split planes to minimize yielding when fractured. As an alternative to heat treating the material, temporary embrittlement for processing purposes may be achieved by reducing the temperature to a sufficiently low level.

Figure 5:
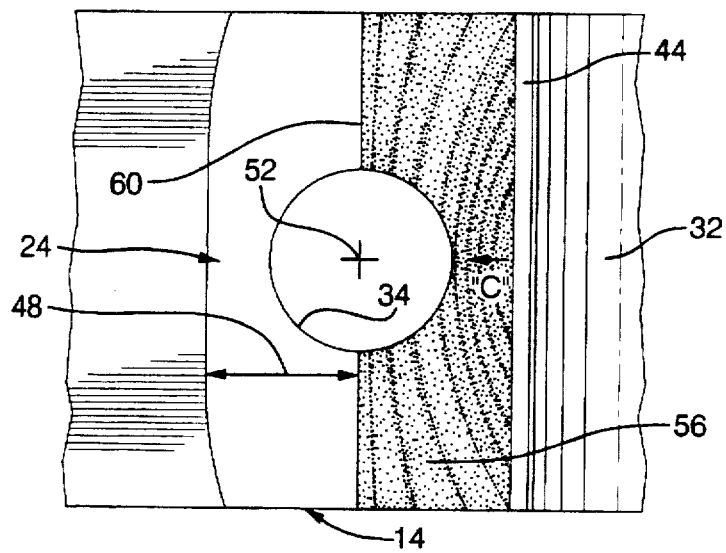
FIG. 5 is a sectional view of the bearing assembly of the present invention taken along line 5—5 of FIG. 3.

When the material along the split planes 38,40 is, or has been made sufficiently brittle, force applying means are utilized to apply a separating force on opposite sides of the bore 32, acting outwardly in opposite directions as shown by the force arrows in FIG. 2. The application of force in this manner causes tension across the split planes extending radially outwardly from the notches 44,46 on opposite sides of the opening 32. The tension causes a crack "C" to propagate from the edge of either one of the notches generally across a split plane 38 or 40, FIG. 5, to terminate along the leading edge 60 or 62 of the saw-cut 48,50, causing fracture separation of one pair of the mating legs, in this case 14 and 20, and forming their mating ends 24,26 as previously described.

After cracking of one pair of legs, continued force application in the bore 32 will cause further expansion of the opening, causing the formation of a second crack along the split plane 40, on the opposite side of the camshaft bearing assembly resulting in separation of the bearing cap 18 and the main body 12. Experience has shown that when fracturing the cap from the body in this manner, excessive bending of the bearing material at the outer edges of the mating legs defined by the second crack and excessive deformation of the opening 32 can be minimized or eliminated through the placement of the saw-cuts or slots 48,50 opposite the crack propagating notches 44,46 along the split planes 38,40 while the selection of slot depth defines a desired cross-section of the mating ends 24,26 and 28,30 following fracture.

While distortion of the material can be severely curtailed by the application of the saw-cuts 48,50 to the bearing assembly 10, a minimal level of distortion is likely to occur in any separation of the type just described. The configuration of the bearing assembly, specifically, the placement of the saw-cuts 48,50 along the split planes 38,40 to reduce the cross-section along the mating ends 24,26 and 28,30 allows for a degree of bolt-up crush, illustrated in FIG. 4, at the mating ends during re-assembly of the bearing assembly 10 which is typically not possible in assemblies having a full cross-section. By controlling the depth of the saw-cuts, the net shape of the final clamped bore can be controlled through a minimization of deformation during fracture and the use of bolt-up crush during re-assembly.

The present invention provides a split bearing assembly which substantially reduces material yielding and deformation during its manufacture while providing for adjustment of the bearing assembly through bolt-up crush during re-assembly. The split bearing assembly utilizes a novel configuration which includes a slot or saw cut along the fracture plane to reduce the cross sectional area of the fracture area thereby reducing the magnitude of the force required to initiate the fracture of the bearing cap from the body. Following the separation of the cap from the body, minor deformation in the bearing assembly may be compensated through the use of bolt-up crush at the mating surfaces of the cap and base. Such crush is facilitated through the reduction in cross-section at the mating surfaces of the bearing.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiment may be modified in light of the above teachings. The embodiment described was chosen to provide an illustration of the principles of the invention and of its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A method for manufacturing a bearing assembly having a saddle like main body with first and second legs and a removable saddle like bearing cap with first and second legs having ends, respectively secured in end-to-end engagement with mating ends of the first and second legs of said body to define a journal receiving opening, said method comprising initially forming the bearing assembly body and cap with mating ends of said legs integrally joined, locating longitudinal notches across the inner edges of opposite sides of said journal receiving opening, to define split planes which define leg ends, and locating radially inwardly extending slots, on said split planes, from the outer surface of said bearing assembly to a location intermediate of said outer surface and the inner edges of said journal receiving opening, wherein said body and cap have substantially final, assembled dimensions, separating said cap from said main body by applying a separating force to said body and said cap in directions normal to said split planes of said legs, said force being applied to opposite sides of said journal receiving opening intermediate of said legs of said body and said cap, said longitudinal notches operable to initiate a fracture and said radially inwardly extending slots operable as a terminus for said fracture, to thereby form said legs of said saddle-like cap and said legs of said body, said first and second legs of said cap and body comprising respectively first and second pairs mateable along said split planes, said split planes having a cross-section which is less than that of said legs due to said radially inwardly extending slots and thereafter assembling said separated pairs of legs in a mated position and applying a clamping force to said bearing assembly, said split plain cross-sections operable, under assembly bolt-up force to crush a desired amount to compensate for deformation during fracture.

2. A split bearing assembly having a saddle-like main body with first and second legs and a removable saddle-like bearing cap with first and second legs having ends respectively secured in end-to-end engagement with mating ends of said first and second legs of said body to define a journal receiving opening, said mating ends each defined by a first portion of rough uneven mating surface formed by fracturing said bearing cap from said main body and a second, radially inwardly extending slot portion operable to reduce the cross-sectional area of said first portion, said first, reduced cross-sectional portion, crushable upon assembly of said cap to said body to eliminate deformation in said bearing assembly.

* * * * *